US010719432B1

(12) United States Patent
Konyshev et al.

(10) Patent No.: US 10,719,432 B1
(45) Date of Patent: *Jul. 21, 2020

(54) IDENTIFYING USER INTERFACE ELEMENTS USING ELEMENT SIGNATURES

(71) Applicant: Softesis Inc., Santa Clara, CA (US)

(72) Inventors: Ivan Konyshev, Belyaevka (UA); Dmytro Shamatrin, Odesa (UA); Pavlo Grebeniuk, Odesa (UA)

(73) Assignee: Softesis Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/660,034

(22) Filed: Oct. 22, 2019

Related U.S. Application Data

(63) Continuation of application No. 16/258,249, filed on Jan. 25, 2019, now Pat. No. 10,474,564.

(51) Int. Cl.
  *G06F 11/36* (2006.01)
  *G06F 9/451* (2018.01)
  *G06N 3/04* (2006.01)

(52) U.S. Cl.
  CPC .......... *G06F 11/3692* (2013.01); *G06F 9/453* (2018.02); *G06F 11/3664* (2013.01); *G06F 11/3684* (2013.01); *G06F 11/3688* (2013.01); *G06N 3/04* (2013.01)

(58) Field of Classification Search
  CPC ........................................ G06F 11/3668–3696
  USPC ....................................................... 717/124
  See application file for complete search history.

(56) References Cited

U.S. PATENT DOCUMENTS

| 8,473,914 B2* | 6/2013 | Bergman ............ G06F 11/3684 717/124 |
| 8,516,442 B2* | 8/2013 | Grechanik ................ G06F 8/38 715/229 |
| 9,535,822 B1* | 1/2017 | Chau ........................ G06F 16/93 |
| 9,977,729 B1* | 5/2018 | Ivancic ............... G06F 11/3612 |
| 10,096,123 B2* | 10/2018 | Zhu ........................ G06K 9/6202 |
| 10,162,740 B1* | 12/2018 | Setty .................... G06F 11/3672 |
| 2004/0194065 A1 | 9/2004 | McGrath et al. |

(Continued)

OTHER PUBLICATIONS

Shauvik Roy Choudhary et al.; "CROSSCHECK: Combining Crawling and Differencing to Better Detect Cross-browser Incompatibilities in Web Applications"; 2012 IEEE Fifth International Conference on Software Testing, Verification and Validation—2012 IEEE.*

(Continued)

*Primary Examiner* — Francisco J Aponte
(74) *Attorney, Agent, or Firm* — Sterne, Kessler, Goldstein & Fox P.L.L.C.

(57) ABSTRACT

Systems and methods for performing automated software testing on user interface elements are disclosed. For instance, a first element of an application can be identified. A signature can be generated for the first element. The signature for the first element can include one or more attributes descriptive of the first element. After an update of the application, a candidate element signature can be generated for one or more candidate elements in the updated application. The signature for the first element can be compared to each candidate element signature to determine whether the first element matches each candidate element, thereby enabling the first element to be located after the update of the application.

17 Claims, 12 Drawing Sheets

(56) References Cited

U.S. PATENT DOCUMENTS

| | | | | |
|---|---|---|---|---|
| 2008/0295076 | A1* | 11/2008 | McKain | G06F 11/368 717/124 |
| 2008/0310736 | A1* | 12/2008 | Chattopadhyay | G06F 11/3692 382/218 |
| 2009/0037883 | A1* | 2/2009 | Garbers | G06F 11/366 717/125 |
| 2009/0217303 | A1* | 8/2009 | Grechanik | G06F 8/38 719/320 |
| 2011/0010644 | A1* | 1/2011 | Merrill | G06F 8/34 715/762 |
| 2011/0252405 | A1* | 10/2011 | Meirman | G06F 11/3692 717/125 |
| 2011/0307865 | A1* | 12/2011 | Grieves | G06F 11/3414 717/124 |
| 2011/0314341 | A1* | 12/2011 | Varadharajan | G06F 11/368 714/38.1 |
| 2012/0023485 | A1* | 1/2012 | Dubey | G06F 8/30 717/125 |
| 2012/0030515 | A1* | 2/2012 | Birakoglu | G06F 11/368 714/38.1 |
| 2013/0159975 | A1* | 6/2013 | Hu | G06F 16/972 717/124 |
| 2014/0072174 | A1* | 3/2014 | Wedge | G06T 7/292 382/103 |
| 2015/0370694 | A1* | 12/2015 | Zhang | G06F 11/3688 717/124 |
| 2015/0378876 | A1* | 12/2015 | Ji | G06F 11/3688 714/38.1 |
| 2016/0132421 | A1* | 5/2016 | Cobb, Jr. | G06F 11/3688 717/131 |
| 2016/0188303 | A1* | 6/2016 | Rodrigues De Araujo | G06F 3/0488 715/762 |
| 2016/0196021 | A1* | 7/2016 | Rahulkrishna | G06F 11/3688 715/760 |
| 2018/0052666 | A1* | 2/2018 | Zhang | G06F 11/3668 |
| 2018/0107580 | A1* | 4/2018 | Zhang | G06F 11/3604 |
| 2018/0253373 | A1* | 9/2018 | Mathur | G06F 11/3688 |

OTHER PUBLICATIONS

International Search Report and Written Opinion of the International Searching Authority directed to related International Patent Application No. PCT/US2020/015236, dated Apr. 7, 2020; 12 pages.

* cited by examiner

IDENTIFYING USER INTERFACE ELEMENTS USING ELEMENT SIGNATURES

CROSS-REFERENCE TO RELATED APPLICATION

This application is a continuation of U.S. patent application Ser. No. 16/258,249 filed on Jan. 25, 2019, which is incorporated by reference herein in its entirety.

FIELD

The present disclosure relates generally to identifying user interface elements, and more particularly identifying user interface elements using element signatures.

BACKGROUND

Many software applications may require reliable identification of user interface elements displayed by the software applications. For instance, software testing tools, such as Selenium, can be used to automate performance of testing operations on user interface elements of software applications. The testing operations can be specified in a software test script configured to validate proper operation of an application or various elements of the application. In particular, the test script can specify user interface elements upon which the testing operations are to be performed, and can further specify the particular testing operations to be performed. The test script can specify a test element upon which the testing operations are to be performed using one or more suitable "locators" specifying one or more attributes of the test element to identify the test element within the application.

After or during performance of the testing operations, the application may be updated. Such an update can change various attributes of the test elements of the application. When attributes of a test element used in a test script locator for the test element are changed, the test script locator may no longer be able to locate and identify the test element. In that case, the test may fail, or the test may no longer appropriately validate the updated elements. For this reason, when an update occurs, a test script may need to be re-written.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of testing a user interface element. The method includes identifying, by one or more computing devices, a first element of an application. The method further includes generating, by one or more computing devices, a signature for the first element. The signature for the first element includes one or more attributes descriptive of the first element. The method further includes, after an update of the application, generating, by one or more computing devices, a candidate element signature for one or more candidate elements in the updated application. Each candidate element signature includes one or more attributes descriptive of the candidate element. The method further includes comparing, by one or more computing devices, the signature for the first element to the one or more candidate element signatures to determine whether the first element matches each candidate element, thereby enabling the first element to be located after the update of the application.

Other aspects of the present disclosure are directed to systems, apparatus, tangible, non-transitory computer-readable media, user interfaces and devices for providing automated software testing configured to locate test elements after an update to an application.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
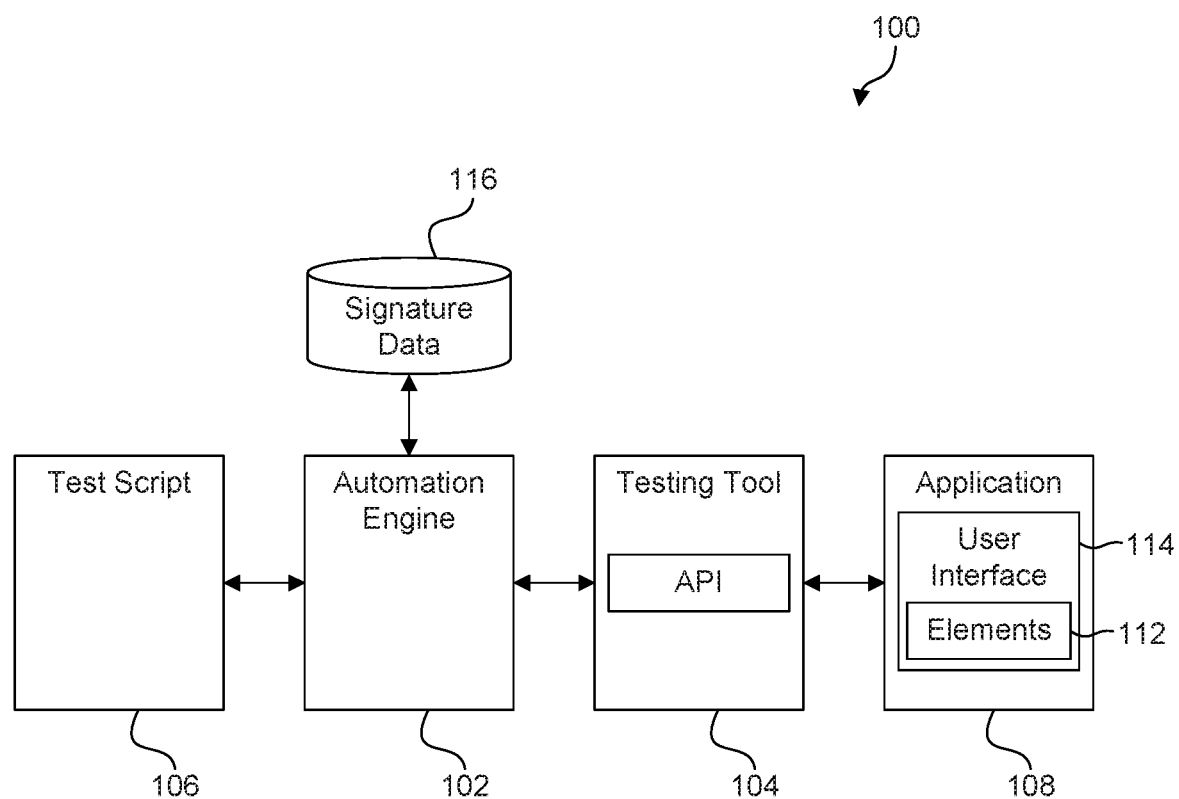
FIG. 1 depicts a system for providing automated software testing according to an embodiment.

Reference will now be made in detail to embodiments, one or more examples of which are illustrated in the drawings. Each example is provided by way of explanation of the embodiments, not limitation of the invention. In fact, it will be apparent to those skilled in the art that various modification and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Example aspects of the present disclosure are directed to reliably identifying user interface elements such that the user interface elements can be correctly identified both prior to and subsequent to a user interface update that changes one or more element attributes associated with the user interface elements. In particular, a signature can be generated for a user interface element that includes one or more attributes descriptive of the element. The signature can be used to subsequently identify the corresponding user interface element within a user interface, for instance, after an update of the user interface caused by a page redeploy, page reload, etc.

Such user interface element identification techniques can be used in various applications, such as for instance, in testing user interface elements in software applications. Software testing tools, including test scripts, can be used to automate performance of testing operations on user interface elements of software applications. Test scripts are used to validate proper operation of a software application, such as a web page. After a test script is created, the application may be updated. The update can, for instance, correspond to a change in the document object model (DOM) of a web page. In instances where the attributes of an element to be tested used to locate the element are changed due to an update of the application, the test script may be unable to locate and identify the element. Unable to identify the updated element, the test script may fail or be unable to validate proper operation of the element.

Embodiments solve this problem by identifying elements to be tested as specified by a software test script after the software application is updated in a manner that changes an element attribute used to locate the corresponding test element. For instance, a signature can be generated for an element of an application upon which testing operations are to be performed.

The signature can include one or more attributes descriptive of the element. The application may be updated, changing the element and its attributes. After the update, elements in the updated application can be selected as candidates to match elements in the prior version of the application. New signatures can be generated for the candidate elements in the updated application. Each candidate element signature can include attributes descriptive of the candidate element. The candidate element signatures can be compared to the initial element signature to determine whether the element matches the candidate element. By comparing the signatures in this way, the element can be identified after the update of the application. This enables further testing operations to be performed on the element of the updated application using the preexisting test script.

The user interface element identification techniques described herein can be used in various other applications. One such example application is in providing tooltip user interface elements that are mapped to various user interface elements displayed in a user interface. Tooltip user interface elements are known in the art, and can generally be defined as interface elements, such as text labels, configured to appear within a user interface in response to occurrence of a triggering event, such as a user hovering over a corresponding user interface element with a cursor, or other event. Tooltips are often used, for instance, in tutorials or wizards, such as for user onboarding services in software applications. Tooltip elements are generally mapped to corresponding user interface elements, such that they can be configured to appear in association with the corresponding user interface element in response to occurrence of the triggering event. In this manner, a developer may map a tooltip to a corresponding user interface element by generating locator (e.g. XPath or other suitable locator) for the corresponding user interface element. However, as described above, such locators can be unreliable when the application updates thereby changing the attribute for the user interface element used in the locator. Accordingly, the tooltip may fail to be properly displayed if the locator for the corresponding user interface element is unreliable.

Similar to that described above with respect to the automated testing, embodiments solve this problem by generating a signature for the corresponding user interface element to which the tooltip is to be mapped. Upon the occurrence of a triggering event for the tooltip, the signature can be retrieved and used to locate the corresponding user interface element within the application in accordance with example aspects of the present disclosure. For instance, signatures can be generated for one or more candidate user interface elements and compared to the retrieved signature to determine which user interface element corresponds to the tooltip. If the corresponding user interface element is identified, the tooltip can be displayed within the application.

Yet another example application for which the user interface element identification techniques can be used is web content transformation proxies, such as used in transforming an existing website configured for display on a desktop computer to a mobile website configured for display on a mobile computing device (e.g. smartphone, tablet, etc.). In such applications signatures can be generated for user interface elements and used to locate the user interface elements according to example aspects of the present disclosure during transformation. It will be appreciated that the techniques described herein are compatible with other suitable applications in which user interface elements are located.

For instance, a user of a mobile device can request a website, and can be automatically redirected to a mobile version of the website. The mobile version of the website can point to a transforming proxy service instead of the original website. The transforming proxy can request an original website page, and can receive a response that includes the original HTML of the website page. The transforming proxy can run a transforming proxy code (e.g. JavaScript) against the received HTML. In some implementations, the transforming proxy code can use a cheerio (e.g. server-side jquery) library to locate and transform elements. Cheerio uses locators to locate the original elements. Similar to that described above with respect to the automated testing and tooltip applications, the locators can be unreliable in the event of an update to the application. In such implementations, signatures can be generated for the user interface elements to be transformed in accordance with example aspects of the present disclosure. The signatures can be used by the transforming proxy to locate the elements. The located elements can then be transformed by the transforming proxy to the appropriate mobile versions. The transformed elements (e.g. transformed HTML) can be returned to the user for display within the mobile website page.

Turning now to the figures, FIG. 1 depicts an example system 100 for performing software testing according to example aspects of the present disclosure. The system 100 includes an automation engine 102 and a testing tool 104 configured to execute a test script 106 to validate proper operation of a test application 108 by performing automated testing operations on the application 108. The testing tool 104 further provides an application programming interface (API) 110 configured to provide an interface between the automation engine 102, the testing tool 104, and the application 108.

The application 108 can be any suitable software application, such as for instance, a web-based application (e.g. an application ran within a web browser). A web-based application may include, for example, HTML, CSS, and JavaScript. The test script 106 can specify operations to be performed on one or more user interface elements 112 of the application 108. The test script 106 may also specify a desired outcome for application 108 when the operations are performed on the user interface elements 112. By establishing that the desired outcome occurs on application of the specified inputs, test script 106 validates that the application 108 functions properly.

For example, the elements 112 can include graphical user interface elements displayed within a user interface 114 of the application 108. The elements 112 can include buttons, menus, windows, icons, text input boxes, text fields, and/or other suitable user interface elements.

The testing tool 104 can be any suitable software testing tool or framework, such as SELENIUM, an open source software testing tool, Other suitable testing tools can be used without deviating from the scope of the present disclosure, such as for instance, Protractor, Cucumber available from Cucumber ltd, Katalon Studio available from Katalon LLC, Ghost Inspector available from Ghost Inspector, Inc., Screenster available from Screenster, LLC, etc. The test script 106 can be written in various suitable programming languages compatible with the testing tool 104. For instance, the test script can be written in Ruby, Java, C-Sharp, Python, JavaScript, Perl, and/or other suitable programming language. As indicated, the API 110 is associated with the testing tool 104 and provides an interface between the application 108 and the testing tool 104 and the automation engine 102. For instance, the API 110 can be configured to be compatible with the application 108, so that the automation engine 102, the testing tool 104 and the application can easily communicate to validate proper operation of the application 108 in accordance with example aspects of the present disclosure. In this manner, the testing tool 104 may be compatible with various APIs, such that a user can select the appropriate API based at least in part on the application to be tested (and/or the web browser in which the application runs).

The testing tool 104 can be configured to perform automated testing operations on the elements 110 based at least in part on the test script 106. More particularly, the test script 106 can specify instructions for locating the elements 112, and performing testing operations on the elements 112. The testing tool 104 can receive and execute the test script 106, and can perform the instructions specified by the test script 106 to validate proper operation of the application 108. In this manner, the test script 106 can specify one or more "locators" associated with the elements 110 that allow the testing tool to identify the elements 112. The locators can specify identifying information of the elements 112. Such identifying information can include attributes descriptive of the elements 112. The locators can be compatible with the testing tool 104. For instance, the SELENIUM testing tool uses locators specifying attributes such as Identifier, Id, Name, Link, DOM, XPath, CSS, or UI-element. Other suitable locators can be used, for instance, that accommodate other suitable testing tools.

In this manner, the testing tool 104 can locate a test element from the elements 112 based at least in part on a locator for the test element specified in the test script 106. The test element can be an element upon which testing operations are to be performed as specified by the test script. As indicated above, the application 108 can update after the testing tool 104 initially locates the test element. Such update can cause the attribute specified by the locator to change, which can prevent the testing tool 104 from subsequently locating the test element using the same locator. For instance, an update can cause a reorganization of the DOM tree, which may provide the test element with a different address in the DOM hierarchy of the updated application 108 as compared to the initial DOM tree of the initial application 108. A test element locator using, for instance, XPath and/or CSS selectors may no longer be able to locate the test element in the updated application 108. The automation engine 102 can be configured to facilitate the location of the test element after such an attribute change when the test element locator may no longer be able to locate the test element.

Figure 2:
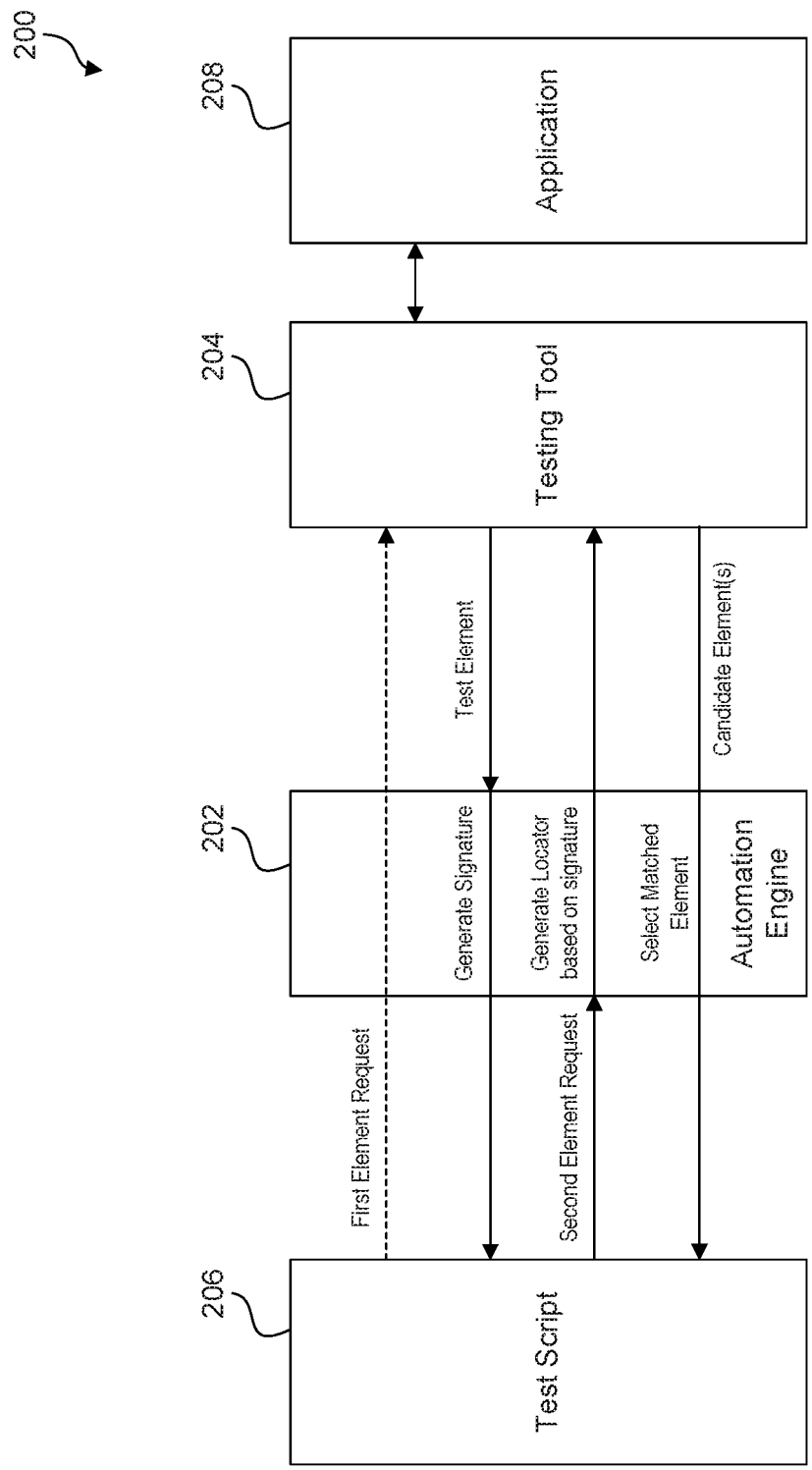
FIG. 2 depicts a system for providing automated software testing according to an embodiment.

In particular, the automation engine 102 can be configured to generate signatures for the test element and candidate elements from the elements 112 of the updated application, and to compare the candidate element signatures with the test element signature to match the test element of the initial application 108 with a candidate element of the updated application 108. This operation is described further with respect to FIG. 2, which depicts an example system 200 for automating software testing of an application according to example embodiments of the present disclosure.

The system 200 can correspond to the system 100 of FIG. 1, or other suitable software testing system. In particular, the system 200 includes an automation engine 202, a testing tool 204 configured to execute a test script 206 to validate proper operation of a test application 208. The testing tool 204 can locate a test element of the application based at least in part on a first element request specified in the test script 206. The first element request can include a suitable locator for the test element. The testing tool 204 can locate the test element from the application 208 based at least in part on the first element request, and can perform any suitable testing operations on the test element as specified in the test script 206. Such testing operations can be associated with a first (initial) test pass. The testing tool can further provide data indicative of the test element to the automation engine 202. The automation engine 202 can generate a signature for the test element (e.g. test element signature). In particular, the test element signature can include attributes descriptive of the test element. In some implementations, the attributes can be different than the attribute used in the initial locator for the test element. In some implementations, the attributes can be attributes that are unlikely to change in response to an update of the application 208. In this manner, the test element signature can include attributes descriptive of the test element, such as a location attribute, address attribute, style attribute, size attribute, name attribute, or ID attribute, and/or other suitable attributes. The test element signature can be stored as signature data 116, for instance, in a suitable memory associated with the automation engine 102.

In some implementations, the automation engine 202 can generate the test element signature based at least in part on an internal HTML representation of the application 208. The HTML representation can be generated statically or dynamically. It can include JavaScript and Cascading Style Sheets. It may be served by a web server, such as the Apache HTTP server. It may be accessed and modeled using a DOM. In this manner, the automation engine 202 can determine of the attributes of the test element signature (e.g. an address or location attribute, dimensional attribute, etc.) based at least in part on the HTML representation. In particular, the automation engine 202 can locate the representation of the test element in the HTML representation, and can determine such attributes from the HTML representation.

A second test pass can be implemented after the performance of the testing operations associated with the first test pass. In some implementations, the second test pass can be a subsequent iteration of the first test pass, and can include the same testing operations to be performed on the test element. In this manner, the test script can include a second element request. The second locate element request can be a request for the test element, and can use the same locator as used in the first element request. However, it will be appreciated that the second locate element request can use a different locator than the first locate element request. In some implementations, the automation engine 202 can generate an updated locator to identify the test element based at least in part on the test element signature. In particular, the updated locator can include data indicative of various suitable attributes as specified in the test element signature, and can be compatible with the testing tool 204 and application 208. Upon generating the updated locator, the automation engine 202 can provide the updated locator to the testing tool 204. The testing tool 204 can locate and identify one or more candidate elements from the application 208 based at least in part on the updated locator.

As indicated, in instances wherein the application 208 updates, during or after the performance of the testing operations associated with the first test pass, thereby causing one or more attributes of the test element to change prior to the second element locate request, the initial locator used in the first element request may no longer be able locate the test element. In particular, the attribute values (e.g. location in the DOM tree) of the first test element used in the initial locator may have changed such that the initial locator may now point to a different element (having the attribute values specified in the initial locator), or may not point to any element. In this regard, the candidate elements can include at least a subset of the elements displayed in the user interface of the application 208 after the first test pass (e.g. after an update of the application 208). In some implementations, the candidate elements can include each element in the updated software application 208. In some implementations, the candidate elements can include a subset of the elements in the updated application 208. The subset can be determined, for instance, based at least in part on the attributes of the elements. As an example, the candidate elements can include all elements of the same type (e.g. text field, button, etc.) as the test element. As another example, the candidate element(s) can include the element having the same address in the DOM tree (e.g. based on Xpath or CSS selectors) as the test element.

Upon identifying the candidate elements, the automation engine 202 can compare the candidate elements to the test element to determine which candidate element matches the test element. In some implementations, the automation engine 202 can generate signatures for the candidate elements (candidate element signature(s)). The candidate element signatures can be generated in the same manner as the test element signature (e.g. based at least in part on the HTML representation), and can include the same or similar attributes as the test element. The candidate element signatures can be stored as signature data 116. As will be described in more detail below with respect to FIGS. 5-8, the automation engine 202 can perform the comparison between the candidate elements and the test element using various suitable comparison techniques. The automation engine 202 can perform the comparison based on various suitable attributes of the test element and the candidate elements. In some implementations, the automation engine 202 can compare the candidate element signature(s) to the test element signature. In some implementations, the automation engine 202 can determine an exact match between the test element signature and a candidate element signature based on the comparison. In some implementations, the automation engine 202 can determine a transformation distance between the test element signature and the candidate element signature(s) based on the comparison. The transformation distance can specify a difference in the attributes between the test element signatures and a candidate element signature. In some implementations, the comparison can be performed using a neural network or other machine learning model. For instance, the comparison can be performed by providing data indicative of the test element signature and the candidate element signatures (or other suitable data indicative of the test element and candidate elements) as input to the neural network that is configured to output a match result indicating whether a candidate element matches the test element.

Upon a determination of a match between the test element and a candidate element (e.g. matched element) by the automation engine 202, the testing tool 204 can perform testing operations on the matched element as specified by the test script 206. The testing operations can be associated with a second test pass. Upon completion of the second test pass, at least a portion of the process can be repeated for one or more subsequent test passes to identify a matched element in the subsequent test pass(es).

As indicated above, the user interface element identification techniques of the present disclosure can be used in various other suitable applications, such as for instance, in web content transformation proxies, tooltip generation, etc. In such applications, the automation engines 102 and/or 202 depicted respectively in FIGS. 1 and 2 can be implemented in the appropriate application environment. For instance, in applications wherein tooltip elements are mapped to corresponding user interface elements, the automation engine 102 and/or 202 can be configured to interface with a system for generating tooltip elements. Such systems can be configured to implement, for instance, tooltip flows for user onboarding services for third party websites or applications. In this manner, the automation engines 102 and/or 202 can be adapted to be implemented in, or otherwise interface with, various suitable systems for various suitable applications to provide reliable user interface element identification according to example aspects of the present disclosure.

Figure 3A:
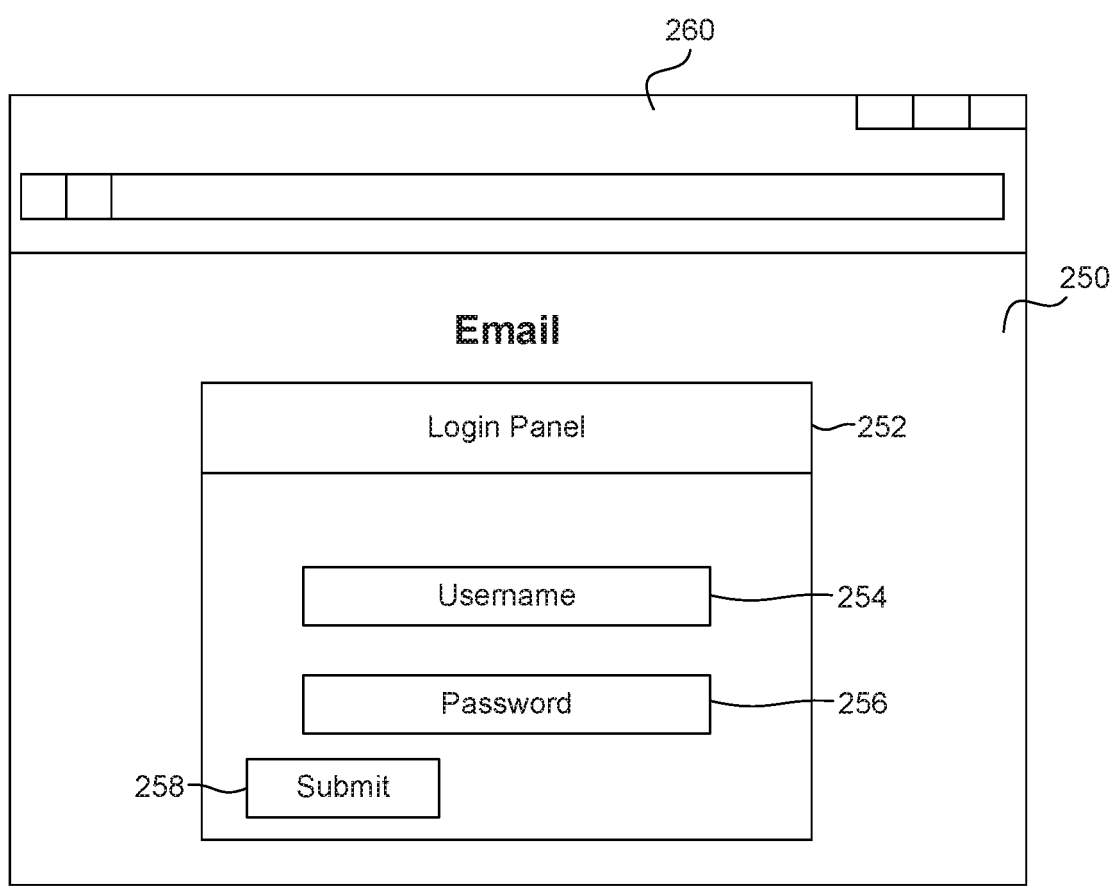
FIG. 3A depicts an application on which testing is to be performed according to an embodiment.

FIG. 3A depicts an example application 250 having a user interface displaying various user interface elements, such as a login panel 252. The login panel 252 includes the "username" text input field 254, the "password" text input field 256 and the "submit" button 258. The application 250 can, for instance, be the application 108 depicted in FIG. 1 or other suitable application. The application 250 is displayed by a web browser 260. A test script can be generated to test the application 250. The test script can include, for instance, an absolute XPath locator for the input field 254, such that the input field 254 can be located and tested using a testing tool, such as SELENIUM. The XPath locator points to the location in the DOM tree where the input field 254 is located. For instance, the XPath locator can be written as: /html/body/div[1]/div/div[2]/form/div[2]/input, which corresponds to the location of the text input field 254 in the DOM tree.

Figure 3B:
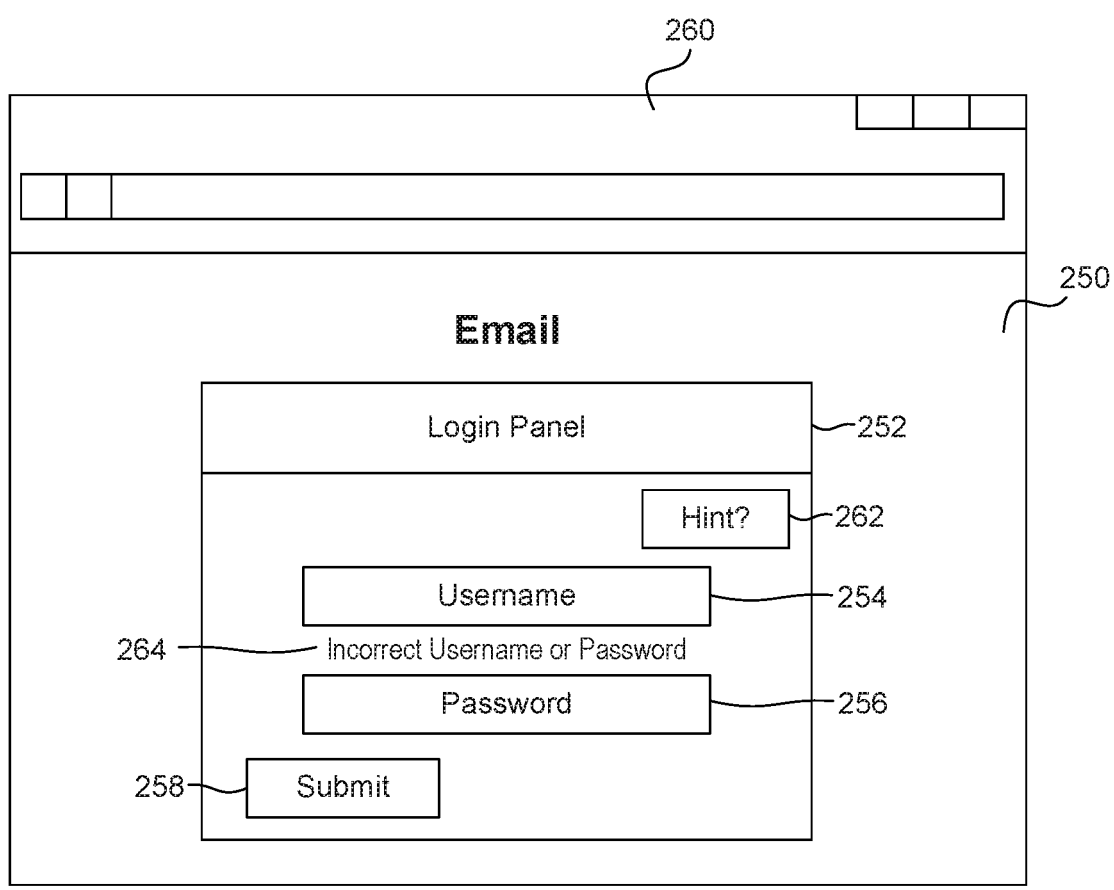
FIG. 3B depicts an updated application on which testing is to be performed according to an embodiment.

During a test pass, the testing tool can locate the input field 254 based on the XPath locator, and can perform testing operations on the input field 254 as specified in the test script. For instance, the testing operations can be specifically designed to test the input field 254. As an example, the testing operations can facilitate the input of an incorrect username into the input field 254. The performance of these testing operations causes an update to the application 250 and a restructuring of the DOM tree. FIG. 3B depicts the application 250 after it has been updated. The update causes a "hint?" button 262 to appear in the login panel 252, along with a text element 264 indicating that the entered username or password is incorrect. Such an update causes the DOM tree to restructure such that the input field 254 has a different location in the restructured DOM tree of the updated application 250 than in the DOM tree of the initial application 250. Accordingly, the XPath locator used above will no longer point to the input field 254. Subsequent attempts to identify the input field 254 using the)(Path locator will thus be unable to do so, and the test script will be unable to validate proper operation of the updated application 250.

In this manner, a signature can be generated for the input field 254. The signature can include one or more attributes descriptive of the input field 254. For instance, such attributes can include attributes that are not likely to change due to an update of the application 250, such as attributes that are not dependent on the location of the input field 254 in the DOM tree. During subsequent tests, one or more elements in the updated application can be selected as candidates that may match the input field 254. For instance, the input fields 254 and 256 can be selected as candidates. Signatures can be generated for these candidates, and the initial signature of the input field 254 can be compared to the signatures of the candidates to determine which candidate is indeed the input field 254. As indicated, the comparison can be performed using various suitable comparison techniques. For instance, the comparison can include determining a transformation distance that specifies a difference in the attributes between the initial signature of the input field 254 and a candidate signatures. Upon a determination of a match, testing operations can be performed on the input field 254.

Figure 4:
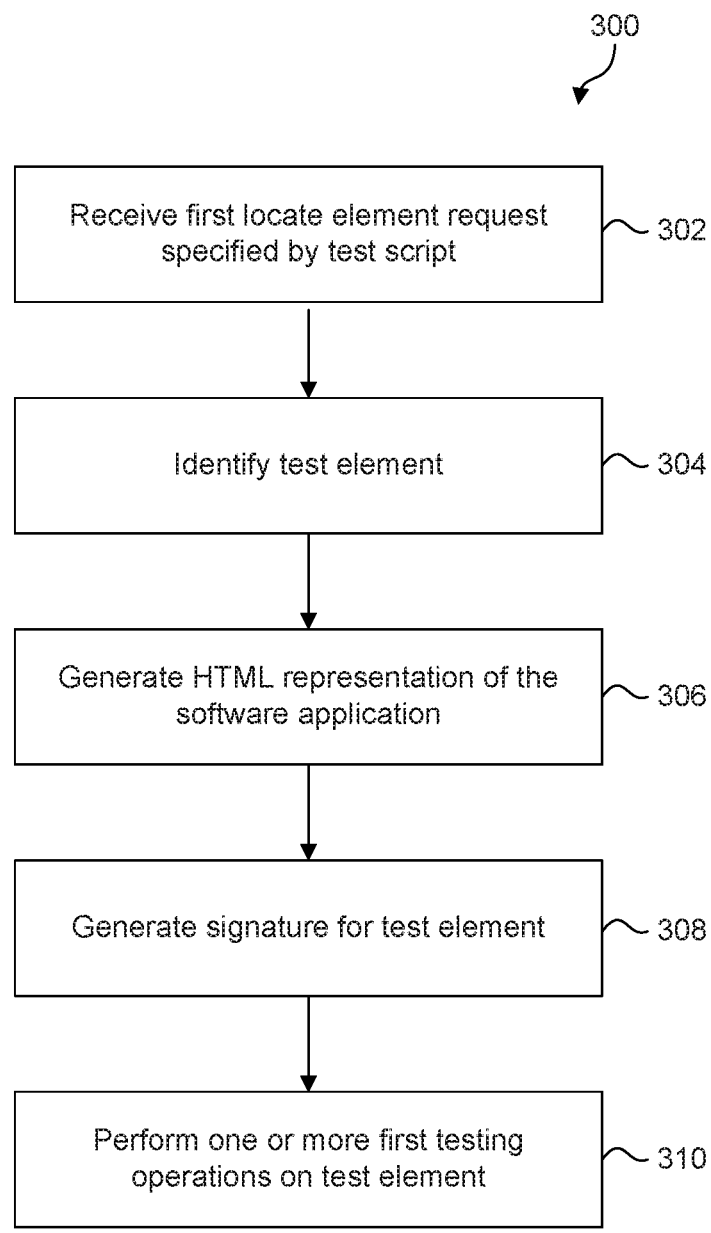
FIG. 4 is a flowchart illustrating a method for providing a first test pass of automated software testing according to an embodiment.

FIG. 4 depicts a flowchart of an example method (300) of performing software testing on a user interface element to validate proper operation of a software application according to an embodiment. The method (300) can be implemented by one or more computing devices, such as one or more of the computing devices described with respect to FIG. 11. In some implementations, the method (300) can be implemented by the automation engine 102 and/or the testing tool 104 of FIG. 1. In addition, FIG. 4 depicts steps performed in a particular order for purposes of illustration and discussion. Those of ordinary skill in the art, using the disclosures provided herein, will understand that the steps of any of the methods described herein can be adapted, rearranged, expanded, omitted, or modified in various ways without deviating from the scope of the present disclosure.

At (302), the method (300) can include receiving a first locate element request specified by a test script. The test script can include various instructions or commands for testing a software application to validate proper operation of the software application. In particular, the test script can include locators that request user interface elements of the software application. The user interface elements can be, for instance, user interface elements displayed within a graphical user interface of the software application, and can include elements such as buttons, menus, windows, icons, text input boxes, text fields, and/or other suitable user interface elements.

The locators can specify various attributes of the elements, such that the elements can be located based at least in part on the attributes. The locators can be compatible with a testing tool (e.g. the Selenium testing tool) configured to perform the software testing on the operation. In this manner, the first locate element request can be associated with a locator for a test element upon which testing operations are to be performed to validate operation of the software application. The test element locator can thus specify attributes of the test element, such that the testing tool can locate the test element within the software application using the test element locator. The test script can further include testing operations to be performed on the test element as part of the software testing.

At (304), the method (300) can include identifying the test element from the software application based at least in part on the test script. The test element can be identified based at least in part on the locator corresponding to the test element as specified in the test script.

At (306), the method (300) can include generating an HTML representation of the software application. HTML may be generated on the client or server side. It may be created using Javascript and AJAX. It may also be created, for example, using an application framework such as Ruby on Rails.

At (308), the method (300) can include generating a signature for the test element based at least in part on the HTML representation. The signature can include attributes of the test element. For instance, the attributes can be attributes specified in the HTML representation, and/or other suitable attributes. For instance, such attributes can include of a location (e.g. a location of the test element within the user interface of the software application), address (e.g. a location of the test element within the DOM of the software application), style (HTML style), size, dimensions, name, or ID, and/or other suitable attribute of the test element.

At (310), the method (300) can include performing testing operations on the test element. As indicated, the testing operations can be specified in the test script. The testing operations can be associated with a first test pass to be performed on the test element. subsequent test passes can subsequently be performed in accordance with example aspects of the present disclosure.

Figure 5:
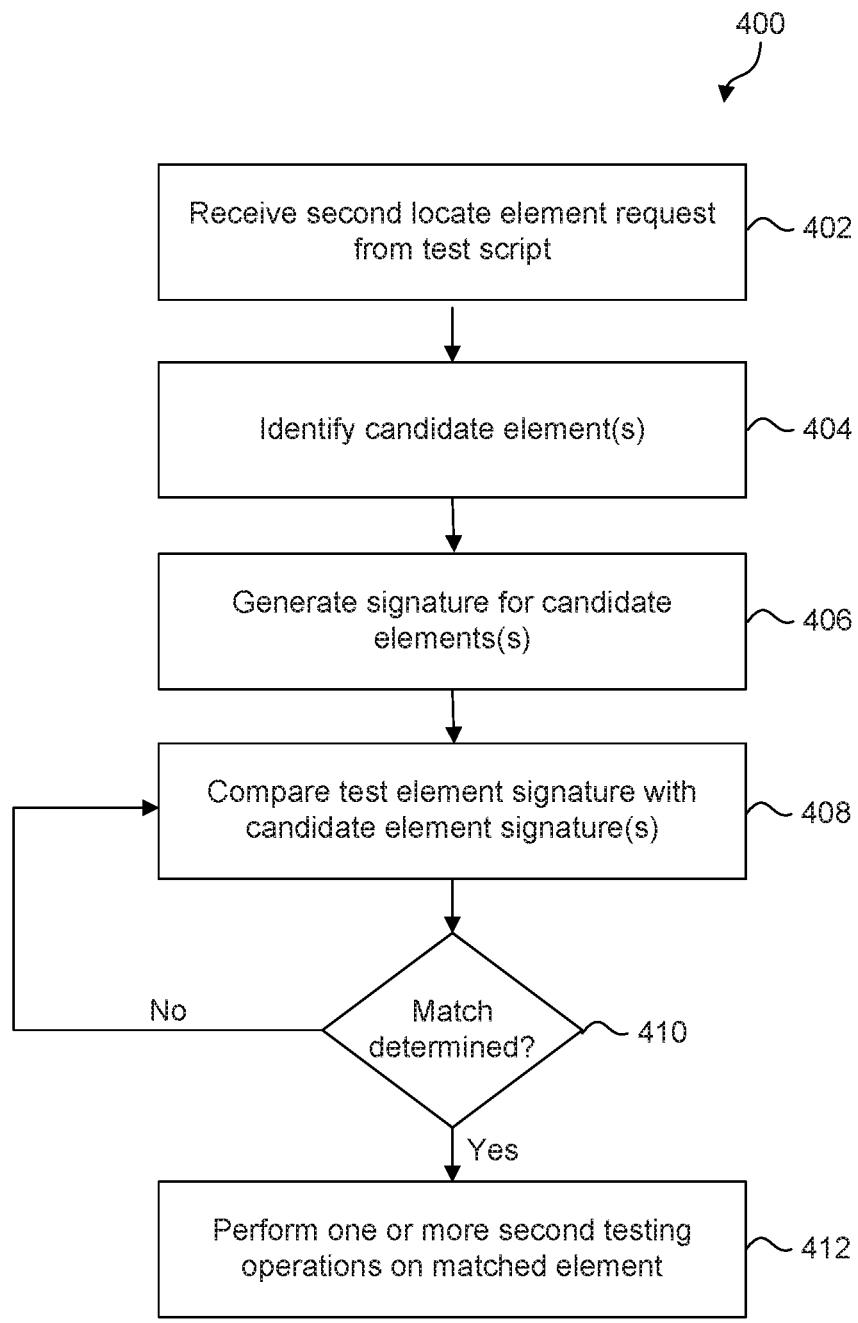
FIG. 5 is a flowchart illustrating a method for providing a second test pass of automated software testing according to an embodiment.

FIG. 5 depicts a flowchart of an example method (400) of performing software testing on an user interface element according to an embodiment. The method (400) can be implemented by one or more computing devices, such as one or more of the computing devices described with respect to FIG. 11. In some implementations, the method (400) can be implemented by the automation engine 102 and/or the testing tool 104 of FIG. 1.

At (402), the method (400) can include receiving a second locate element request from the test script. The second locate element request can be a subsequent locate element request to the first locate element request described with respect to (302) of the method (300) described with respect to FIG. 4. In this manner, in some implementations, the method (400) can be performed after the performance of the method (300). The second locate element request can be associated with a second test pass to be performed by the testing tool after the first test pass. The second locate element request can be a request for the test element (e.g. the test element described with respect to the method (300).

As indicated, in some instances, during or after the performance of the testing operations of the first test pass, the software application may update, such that attributes of the test element (and/or other user interface elements of the software application) can change. Such changed attributes include the attribute specified by the test element locator of the first locate element request. In such case, the test element locator may be unable to locate the test element, which would cause the test pass to fail.

In this manner, at (404), the method (400) can include identifying candidate elements in the software application. The candidate elements can include at least a subset of the elements of the software application. For instance, in some implementations, identifying the candidate elements can include identifying each candidate element in the software application, such that each element is a candidate element. In some implementations, identifying the candidate elements can include identifying candidates based at least in part on the attributes of the elements of the software application. For instance, in such implementations, as will be described in greater detail with respect to FIG. 6, identifying the candidate elements can include assigning an element having the same DOM tree address as the test element as a candidate element, and/or assigning an element having the same ID as the test element as a candidate element. As another example, identifying the candidate element(s) can include assigning each element of the same type as the test element (e.g. text field, button, etc.) as a candidate element. In this manner, candidate element(s) can be identified based at least in part on the test element signature, and can be located in the application using suitable locators that specify the appropriate attributes.

At (406), the method (400) can include generating signatures for each candidate element. The signatures can be generated in the same manner as the test element signature, and can include the same attributes as the test element signature, such that the candidate element signature(s) can be compared to the test element signature. In some implementations, a second HTML representation can be generated prior to generating the candidate element signature(s), such that the second HTML representation reflects any updates to the software application and/or the elements of the software application.

At (408), the method (400) can include comparing the test element signature with the candidate element signature(s). The comparison can be performed to determine which of the candidate elements (if any) correspond to the test element, such that the second test pass can be performed on the appropriate element. In some instances, the comparison may identify an exact match between the test element and a candidate element. In some instances, the comparison may identify differences between the test element and each candidate element. In some implementations, as will be described in greater detail with respect to FIG. 7, the comparison can include determining a transformation distance between the test element and the candidate element(s). The transformation distance can describe a difference in attributes between the test element and a candidate element, as specified in the respective signatures.

At (410), the method (400) can include determining whether a candidate element sufficiently matches the test element. More particularly, the method (400) can include determining whether a candidate element matches the test element to a sufficient degree, such that it can safely be assumed that the candidate element is the same element as the test element.

For instance, in scenarios where the software application does not update (and/or the attribute specified in the test element locator does not change), the test element attributes may remain exactly the same, and the comparison may thus yield an exact match between a candidate element and the test element. In some instances, the software application may update but the test element locator attribute may remain the same, in which case an exact match may be similarly found. In instances where the test element locator attribute changes, an exact match may still be found if the attributes included in the test element signature remain unchanged. In instances where one or more test element signature attributes change, an exact match may not be found. In such instances, a match may still be determined if the difference between a candidate element signature the test element signature is sufficiently small. As indicated, an example technique of determining a difference between a candidate element and a test element includes determining a transformation distance (described in greater detail below) between the candidate element signature and the test element signature. However, it will be appreciated that various comparison techniques can be used. It will be further appreciated that various thresholds and criteria can be used for determining what constitutes a sufficiently small difference to qualify as a match.

At (412), the method (400) can include performing second testing operations on the matched element (e.g. the candidate element matched to the test element). The second testing operations can be associated with the second test pass.

Figure 6:
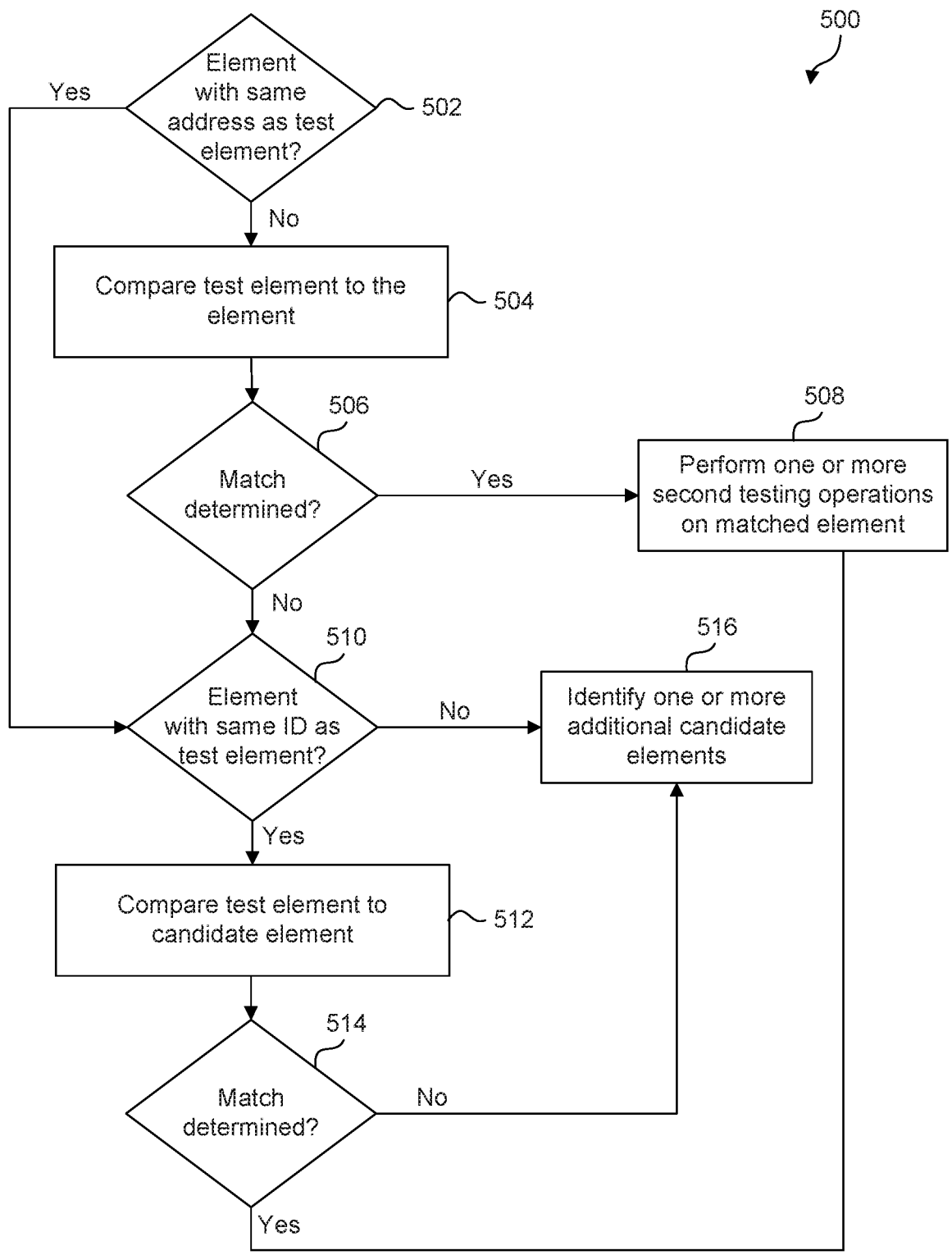
FIG. 6 is a flowchart illustrating a method for providing a second test pass of automated software testing according to an embodiment.

FIG. 6 depicts a flowchart of an example method (500) of performing software testing on a user interface element according to an embodiment. The method (500) can be implemented by one or more computing devices, such as one or more of the computing devices described with respect to FIG. 11. In some implementations, the method (500) can be implemented by the automation engine 102 and/or the testing tool 104 of FIG. 1.

As indicated above, in light of a potential update by the software application, subsequent test passes to the first test pass can include selecting candidate elements that can be compared to the test element to determine a candidate element that matches the test element. In some implementations, the candidate element(s) can be selected based on attributes. Although the method (500) described below describes selecting candidate elements based on the address attribute and ID attribute, it will be appreciated that any suitable attribute can be used.

In this manner, at (502), the method (500) can include determining whether an element in the software application has the same address as the test element (from the first test pass described with respect to the method (300) in FIG. 4).

If an element does have the same address as the test element, at (504), the method (500) can include selecting the element as a candidate element and/or comparing the test element with the candidate element. The comparison can be performed to ensure that the candidate element having the same address as the test element is actually same element as the test element and not a different element that was assigned the address as part of an update to the software application. The comparison can be performed in various suitable manners, such as those described with respect to any of FIG. 1-5 or 7-8. In this manner, the comparison can be performed by comparing the test element signature to the candidate element signature.

At (506), the method (500) can include determining whether the candidate element matches the test element based at least in part on the comparison. As described above, a match can be determined when the comparison yields an exact match or when the difference between the test element and the candidate element is sufficiently small. If a match is determined, at (508), the method (500) can include performing the one or more second testing operations on the matched element.

If it is determined that the candidate element does not match the test element (e.g. if the test element signature is sufficiently different from the candidate element signature), at (510), the method (500) can include determining whether an element in the software application has the same ID as the test element. Similarly, if, at (502), no element in the software application has an address that is the same as the test element address, the method (500) can proceed directly to (510).

If an element has the same ID as the candidate element, at (512), the method (500) can include selecting the element as a candidate element and/or comparing the test element to the candidate element to determine if the candidate element matches the test element.

At (514), the method (500) can include determining whether a match is determined between the test element and the candidate element. If a match is determined, the method (500) can proceed back to (508). If it is determined that the candidate element does not match the test element, at (516), the method (500) can include identifying one or more additional candidate elements for comparison to the test element. Similarly, if, at (510), no element has the same ID as the test element, the method (500) can proceed directly to (516). In this manner, a match is not found between the test element and the candidate elements, the search can be expanded to additional candidate elements. The additional candidate elements can be selected in any suitable manner using any suitable criteria.

Figure 7:
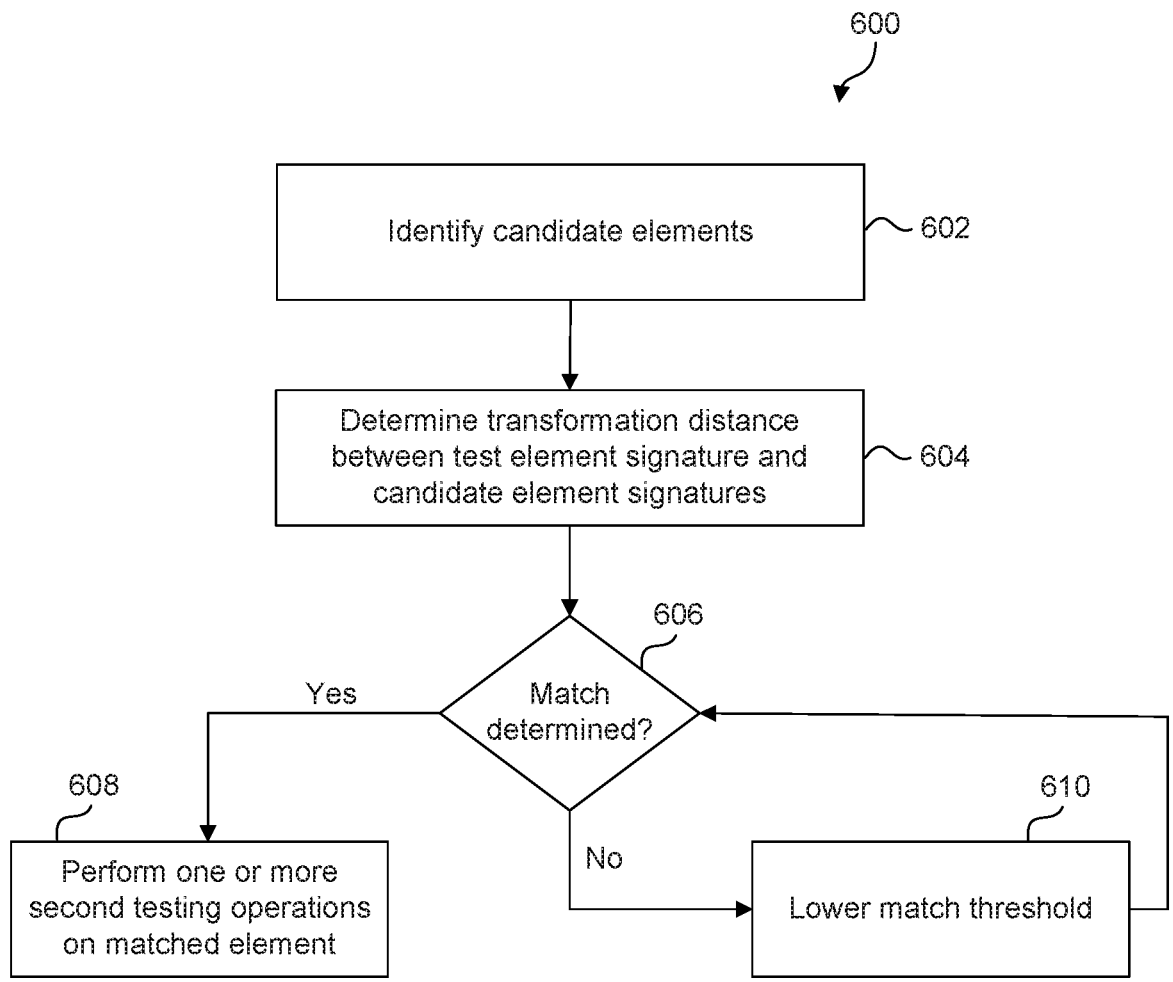
FIG. 7 is a flowchart illustrating a method for providing a second test pass of automated software testing according to an embodiment.

FIG. 7 depicts a flowchart of an example method (600) of performing software testing on a user interface element according to an embodiment. The method (600) can be implemented by one or more computing devices, such as one or more of the computing devices described with respect to FIG. 11. In some implementations, the method (600) can be implemented by the automation engine 102 and/or the testing tool 104 of FIG. 1.

As indicated above, in some implementations, the comparison between the candidate element(s) and the test element can include determining a transformation distance between the candidate element signature(s) and the test element signature. In this manner, at (602), the method (600) can include identifying candidate elements. The candidate elements can be identified in any suitable manner and can include at least a subset of the user interface elements of the software application.

At (604), the method (600) can include determining a transformation distance between the test element signature and candidate element signatures. The transformation distance between the test element signature and a candidate element signature can describe a difference in attributes between the test element signature and the candidate element signature. In this manner, the attributes of the test element signature can be compared to the corresponding attributes of the candidate element signature. Any differences can be quantified and represented in the transformation distance. The transformation distance can be a score or other metric that describes the differences. In some implementations, the transformation distance can represent a degree of difference between corresponding attributes. For instance, the size attribute specified in the test element signature can be compared to the size attribute of the candidate element signature. The transformation distance can be determined based at least in part on the difference between the sizes, not merely the fact that the sizes are different. The attributes can be given various weightings such that different attributes have different effects on the overall transformation distance. It will be appreciated that the transformation distance can be determined using various suitable techniques, methodologies, or criteria, and that the transformation distance can be represented in various suitable forms (e.g. percent difference, placement on a scale, ranking of most different to least different between the candidate elements, etc.).

At (606), the method (600) can include determining whether a candidate element matches the test element based at least in part on the transformation distance. A match can be determined, for instance, if the transformation distance indicates an exact match. In some implementations, a match can be determined if the transformation distance is less than some designated threshold. As yet another example, in instances where transformation distances are found for multiple candidate elements, a match can be determined for the candidate element having the lowest transformation distance.

If a match is determined, at (608), the method (600) can include performing the second testing operations on the matched element.

It will be appreciated that the process of comparing the candidate elements to the test element can be performed in various suitable orders. For instance, in some implementations, the process can be performed iteratively such that a transformation distance is determined for a first candidate element to determine whether the candidate element matches the test element. If a match is determined the testing operations can then be performed on the matched element. If it is determined that the candidate element does not match the test element, the process can repeat for one or more additional candidate elements. In some implementations, transformation distances can be determined for each candidate element before a match is determined.

If it is determined that no candidate element matches the test element, at (610), the method (600) can include lowering the match threshold. As indicated, the match threshold can be the threshold for determining acceptable transformation distances in determining a match. Once the threshold is lowered, the method can proceed back to (606).

Figure 8:
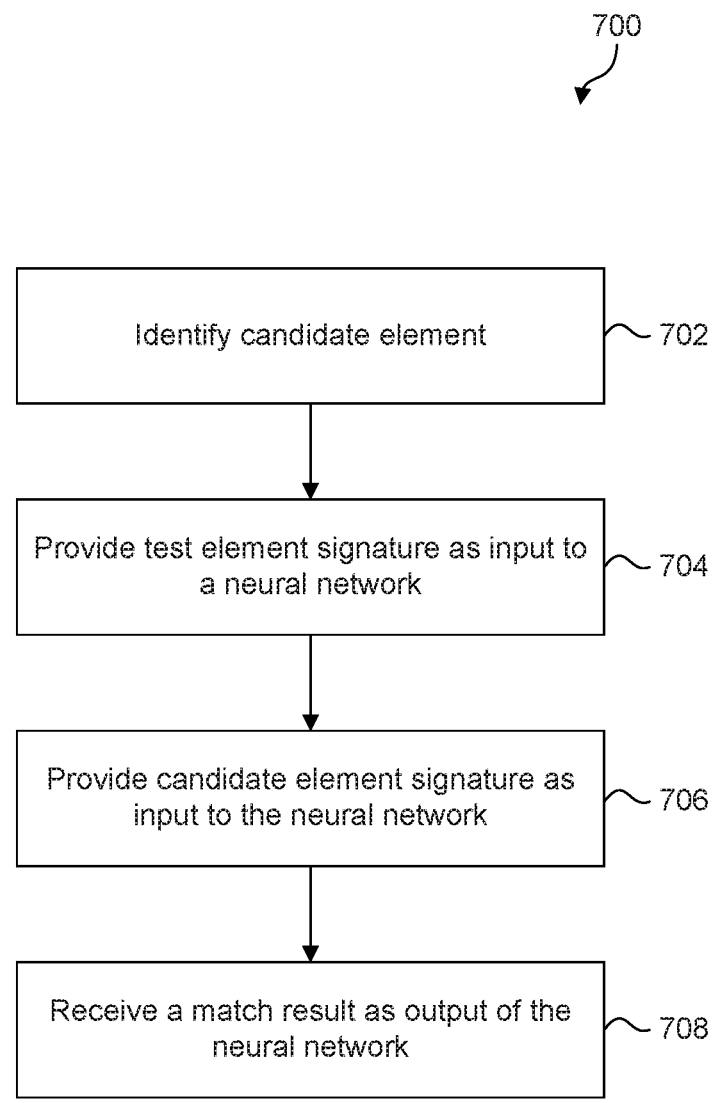
FIG. 8 is a flowchart illustrating a method for comparing a test element to a candidate element using a neural network according to an embodiment.

FIG. 8 depicts a flowchart of an example method (700) of comparing a test element to one or more candidate elements according to an embodiment. The method (700) can be implemented by one or more computing devices, such as one or more of the computing devices described with respect to FIG. 11. In some implementations, the method (700) can be implemented by the automation engine 102 and/or the testing tool 104 of FIG. 1.

As indicated, the comparison between the test element and a candidate element be performed using a neural network. In this manner, at (702), the method (700) can include identifying a candidate element. The candidate element can be selected in any suitable manner.

At (704), the method (700) can include providing the test element signature as input to a neural network. The neural network can be configured to determine a match result between the test element and a candidate element. The match result can indicate whether the neural network interprets the candidate element is the same element as the test element. The neural network can have various suitable architectures, including an input layer, an output layer, and one or more hidden layers between the input and output layers. Each layer can have one or more neurons, having various assigned weights. The weights can be assigned using various suitable training techniques (e.g. backpropagation and/or other suitable techniques), and using suitable training data. In some implementations, the neural network can be trained to determine the match result based on perceptions of the visible impact to the human eye of changes of various attributes (e.g. size, shape, color, etc.) of user interface elements. In this manner, the match result can be determined based on such perceptions of the human eye.

The neural network can be configured to accept as input at the input layer data indicative of a test element signature and data indicative of a candidate element signature. The neural network can be configured to propagate the input data through the neural network, and to provide as output the match result. As indicated, the match result can specify an interpretation of the neural network of whether the test element matches the candidate element.

At (706), the method (700) can include providing a candidate element signature as input to the neural network. As indicated, the candidate element signature can be provided as input along with the test element signature such that the neural network can determine a match result between the test element and the candidate element.

At (708), the method (700) can include receiving the match result as output of the neural network. In some implementations, if the match result indicates a match, testing operations can be performed on the matched element. If the match result indicates that the test element does not correspond to the candidate element, the method (700) can repeat one or more times for one or more additional candidate elements to determine a candidate element that matches the test element.

Figure 9:
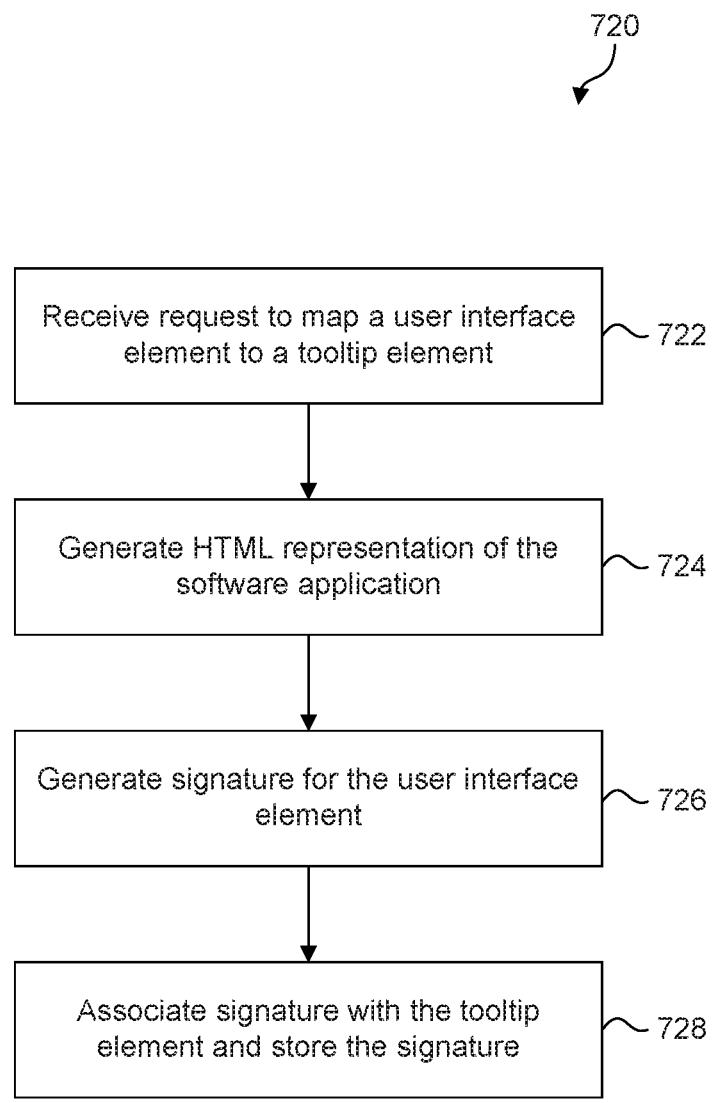
FIG. 9 depicts a flow chart illustrating a method for associating a tooltip element with a corresponding user interface element according to an embodiment.
Figure 10:
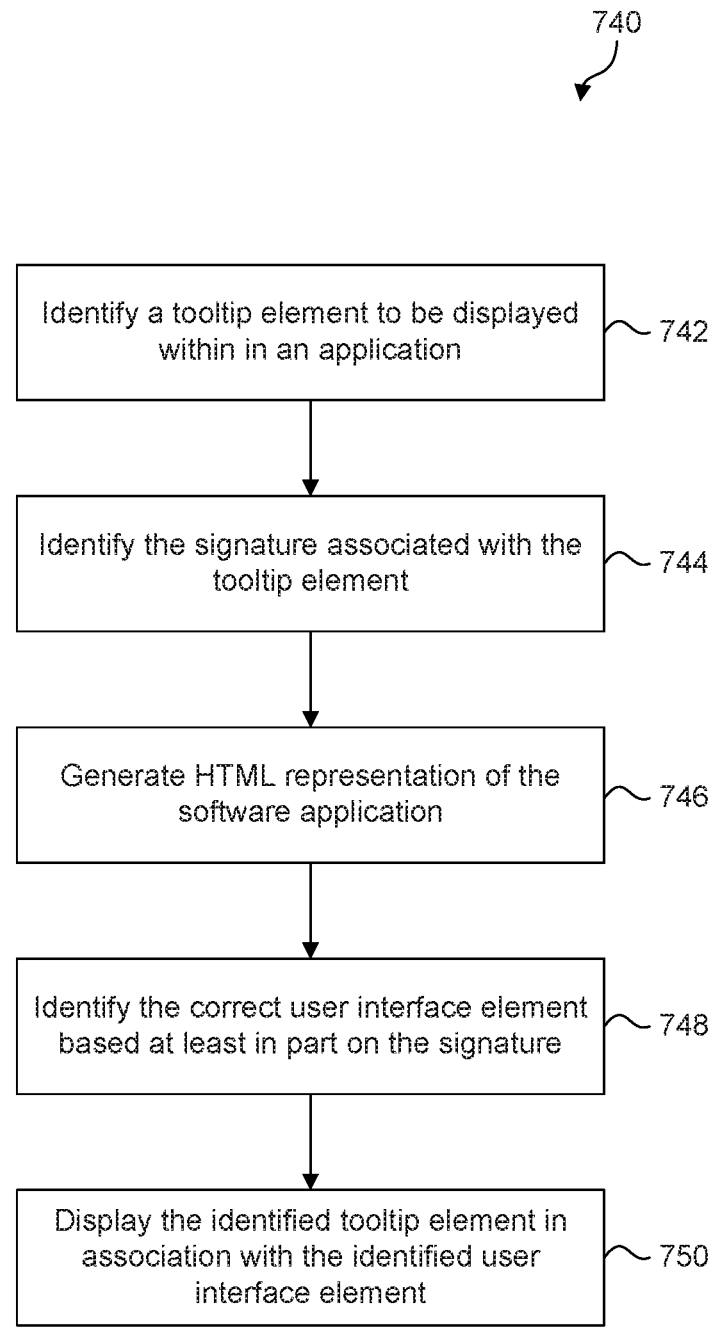
FIG. 10 depicts a flowchart illustrating a method for displaying a tooltip element in association with a corresponding user interface element according to an embodiment.

FIGS. 9 and 10 depict flowcharts of example methods of identifying use interface elements in association with a tooltip user interface element according to example embodiments of the present disclosure. In particular, FIG. 9 depicts a flowchart of an example method (720) of mapping a user interface element to a tooltip element. The method (720) can be implemented by one or more computing devices, such as one or more of the computing devices described with respect to FIG. 11. In some implementations, the method (720) can be implemented at least in part by the automation engine 102 of FIG. 1.

At (722), the method (720) can include receiving a request to map a tooltip user interface element to a corresponding user interface element of a software application, such as a web-based application. As indicated, the tooltip element may be configured to be displayed as part of a tutorial or wizard, for instance, as part of a user onboarding service for the application. In this manner, the tooltip element can be displayed in association (e.g. overlaying, in proximity to, etc.) a corresponding user interface element of the application.

At (724), the method (720) can include generating an HTML representation of the software application. HTML may be generated on the client or server side. It may be created using Javascript and AJAX. It may also be created, for example, using an application framework such as Ruby on Rails. In some implementations, a CSS representation (e.g. CSS tree) may be generated in addition to or alternative to the HTML representation. Similar to the HTML representation, the CSS representation may be generated on the client side or the server side. For instance, in some implementations the CSS and/or HTML representations can be generated using a web browser extension.

At (726), the method (720) can include generating a signature for the user interface element based at least in part on the HTML representation. The signature can be generated in accordance with example aspects of the present disclosure. For instance, the signature can include a current position or address of the user interface element as displayed in the user interface of the application. The current position or address can be specified in the HTML and/or CSS representation.

At (728), the method (720) can include associating the signature with the tooltip element, and storing the signature in a memory. In this manner, the signature for the user interface element provides an association between the user interface element and the tooltip element. The signature can be stored, for instance, in a suitable database associated with the system.

FIG. 10 depicts a flowchart for an example method (740) of displaying a tooltip element in association with a corresponding user interface element according to example aspects of the present disclosure. The method (740) can be implemented by one or more computing devices, such as one or more of the computing devices described with respect to FIG. 11. In some implementations, the method (740) can be implemented at least in part by the automation engine 102 of FIG. 1.

At (742), the method (740) can include identifying a tooltip element to be displayed within an application. As indicated, the tooltip element can be displayed in response to a triggering event. In some implementations, the triggering event can be a user interaction with the corresponding user interface element (such as hovering above the corresponding user interface element with a cursor). In some implementations, the triggering event can be associated with a flow of a tutorial or wizard. As an example, the tooltip can be displayed upon navigation to the application by a user who has not been shown the tooltip previously. In such instances, upon navigation to the application (e.g. web application) by the user, the tooltip element can be displayed in response to a determination that the tooltip element is the first tooltip element of the flow of the tutorial that has not been shown to the user (e.g. based on a JavaScript representation of the service associated with the tooltip element.

At (746), the method (740) can include identifying the signature associated with the tooltip element. As indicated above, user interface element signatures can be associated with corresponding tooltip elements, and stored in a suitable memory. Upon identification of the tooltip element to be displayed, the corresponding element signature can be identified and accessed to locate the user interface element to which the signature belongs.

At (744), the method (740) can include generating an HTML representation of the software application. HTML may be generated on the client or server side. It may be created using Javascript and AJAX. It may also be created, for example, using an application framework such as Ruby on Rails. In some implementations, a CSS representation (e.g. CSS tree) may be generated in addition to or alternative to the HTML representation. Similar to the HTML representation, the CSS representation may be generated on the client side or the server side. For instance, in some implementations the CSS and/or HTML representations can be generated using a web browser extension.

At (748), the method (740) can include identifying the correct user interface element based at least in part on the signature and the HTML and/or CSS representation. The user interface element can be identified using suitable techniques disclosed herein. For instance, in some implementations, one or more candidate user interface elements can be identified, and signatures can be generated for the candidate user interface elements. The candidate signatures can be compared with the signature associated with the tooltip element to determine which, if any, candidate user interface element is mapped to the tooltip element.

At (750), the method (740) can include displaying the identified tooltip element in association with the corresponding identified user interface element. It will be appreciated that, in instances, wherein the correct user interface element is not identified in (748), the tooltip element may not be displayed.

Figure 11:
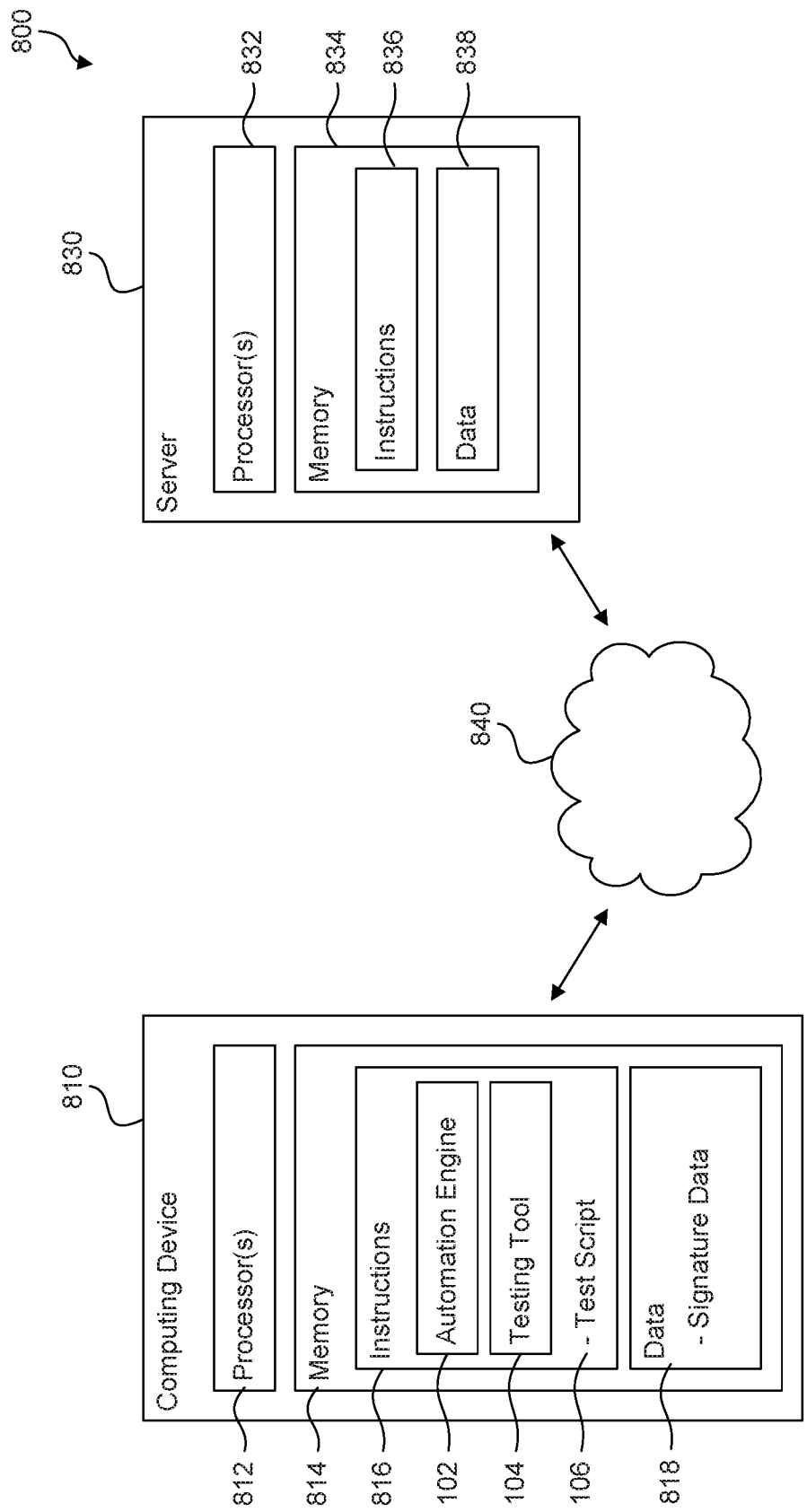
FIG. 11 depicts an example system according to example aspects of the present disclosure.

FIG. 11 depicts an example system 800 that can be used to implement the methods and systems of the present disclosure. The system 800 can be implemented using a client-server architecture that includes a user computing device 810 that communicates with one or more remote computing devices, such as server 830. The system 800 can be implemented using other suitable architectures, such as a single computing device.

As shown, the system 800 can include a user computing device 810. The user computing device 810 can be any suitable type of user computing device, such as a smartphone, tablet, cellular telephone, wearable computing device, or any other suitable user computing device capable of being used in mobile operation. The user computing device 810 can include one or more processor(s) 812 and one or more memory devices 814.

The one or more processor(s) 812 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 814 can include one or more computer-readable media, including, but not limited to, non-transitory computer-readable media, RAM, ROM, hard drives, flash memory, or other memory devices.

The one or more memory devices 814 can store information accessible by the one or more processors 812, including instructions 816 that can be executed by the one or more processors 812. For instance, the memory devices 814 can store the instructions 816 for implementing one or more modules configured to implement the automation engine 102, the testing tool 104, and/or other suitable modules. The instructions can further include the test script 106.

Each module can include computer logic utilized to provide desired functionality. Thus, each module can be implemented in hardware, application specific circuits, firmware and/or software controlling a general purpose processor. In one embodiment, each module are program code files stored on the storage device, loaded into memory and executed by a processor, or can be provided from computer program products, for example computer executable instructions, that are stored in a tangible computer-readable storage medium such as RAM, hard disk or optical or magnetic media. Each module can correspond to one or more different programs, files, circuits, or sets of instructions. Likewise, two or more of the modules can be combined into a single program, file, circuit, or set of instructions.

The instructions 816 can further include instructions for implementing a browser for other software application, or for performing other functions on the user computing device 810. For instance, the software application can be used to exchange data with server 830 over the network 840. The instructions 816 can include client-device-readable code for providing and implementing aspects of the present disclosure.

The one or more memory devices 814 can also include data 818 that can be retrieved, manipulated, created, or stored by the one or more processors 812. The data 818 can include, for instance, signature data and/or other data.

The user computing device 810 can include various input/output devices for providing and receiving information from a user, such as a touch screen, touch pad, data entry keys, speakers, and/or a microphone suitable for voice recognition. For instance, the user computing device 810 can have a display 820 for presenting a user interface to a user.

The user computing device 810 can further include a positioning system 824. The positioning system 824 can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system (e.g. using positioning sensors, such as an inertial measurement unit), a dead reckoning system, based on IP address, by using triangulation and/or proximity to cellular towers, Bluetooth hotspots, BLE beacons, Wi-Fi access points or Wi-Fi hotspots, Wi-Fi time-of-flight, and/or other suitable techniques for determining position.

The user computing device 810 can also include a network interface used to communicate with one or more remote computing devices (e.g. server 830) over a network 840. The network interface can include any suitable components for interfacing with one more networks, including for example, transmitters, receivers, ports, controllers, antennas, or other suitable components.

In some implementations, the user computing device 810 can be in communication with a remote computing device, such as a server 830 over network 840. Server 830 can include one or more computing devices. The server 830 can include one or more computing devices, and can be implemented, for instance, as a parallel or distributed computing system. In particular, multiple computing devices can act together as a single server 830.

Similar to the user computing device 810, the server 830 can include one or more processor(s) 832 and a memory 834. The one or more processor(s) 832 can include one or more central processing units (CPUs), and/or other processing devices. The memory 834 can include one or more computer-readable media and can store information accessible by the one or more processors 832, including instructions 836 that can be executed by the one or more processors 832, and data 838. For instance, although the automation engine 102 and testing tool 104 are depicted in FIG. 11 as being included in the user computing device 810, in other implementations, at least portions of one or more of the automation engine 102 and testing tool 104 can be included in the server 830. In such implementations, at least some of the functionality performed by the automation engine 102 and/or the testing tool 104 can be performed by the server 830.

The data 838 can be stored in one or more databases. The data can include signature data and other data. The one or more databases can be connected to the server 830 by a high bandwidth LAN or WAN, or can also be connected to server 830 through network 840. The one or more databases can be split up so that they are located in multiple locales.

Server 830 can also include a network interface used to communicate with computing device 810 over network 840. The network interface can include any suitable components for interfacing with one more networks, including for example, transmitters, receivers, ports, controllers, antennas, or other suitable components.

Network 840 can be any type of communications network, such as a local area network (e.g. intranet), wide area network (e.g. Internet), cellular network, or some combination thereof. Network 840 can also include a direct connection between the user computing device 810 and server 830. Network 840 can include any number of wired or wireless links and can be carried out using any suitable communication protocol.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for identifying user interface elements for performing testing operations as specified by one or more testing scripts, the method comprising:
    identifying, by one or more computing devices, a first element of an application;
    generating, by one or more computing devices, a signature for the first element, the signature for the first element comprising one or more attributes descriptive of the first element;
    after an update of the application, generating, by one or more computing devices, a candidate element signature for one or more candidate elements in the updated application, each candidate element signature comprising one or more attributes descriptive of the candidate element;
    comparing, by one or more computing devices, the signature for the first element to each candidate element signature to determine whether the first element matches each candidate element, thereby enabling the first element to be located after the update of the application, the comparing comprising determining a transformation distance between the signature for the first element and each candidate element signature;
    determining, by one or more computing devices, that a first candidate element from the one or more candidate elements matches the first element based at least in part on the transformation distance between the signature for the first element and the candidate element signature for the first candidate element;
    upon determining that the first candidate element matches the first element, performing, by one or more computing devices, one or more testing operations on the first candidate element as specified by the one or more testing scripts.

2. The computer-implemented method of claim 1, further comprising identifying, by one or more computing devices, the one or more candidate elements from the updated software application.

3. The computer-implemented method of claim 2, wherein identifying, by one or more computing devices, the one or more candidate elements of the updated application comprises identifying a candidate element that has the same address as the first element.

4. The computer-implemented method of claim 2, wherein identifying, by one or more computing devices, the one or more candidate elements of the updated application comprises identifying a candidate element that has a same ID as the first element.

5. The computer-implemented method of claim 1, wherein the transformation distance describes a degree of difference in attributes between the signature for the first element and a candidate element signature.

6. The computer-implemented method of claim 1, wherein the one or more attributes associated with the first element comprise one or more of a location attribute, address attribute, style attribute, size attribute, name attribute, or ID attribute.

7. The computer-implemented method of claim 1, wherein the first element is a test element specified in a software test script configured to validate proper operation of the application.

8. The computer-implemented method of claim 1, wherein the update to the application causes a change to at least one of the one or more attributes associated with the first element.

9. The computer-implemented method of claim 1, further comprising:
    generating, by one or more computing devices, an internal HTML representation associated with the application; and wherein
    generating, by one or more computing devices, the signature for the first element comprises generating the signature for the first element based at least in part on the internal HTML representation; and
    generating, by one or more computing devices, a candidate element signature comprises generating the candidate element signature based at least in part on the internal HTML representation.

10. The computer-implemented method of claim 1, wherein the first element is associated with a tooltip user interface element to be displayed in the application.

11. The computer-implemented method of claim 1, wherein the first element is associated with a web content transformation.

12. A computing system comprising:
    one or more processors;
    one or more memory devices, the one or more memory devices storing computer-readable instructions that when executed by the one or more processors cause the one or more processors to perform operations for identifying user interface elements for performing testing operations as specified by one or more testing scripts, the operations comprising:
        identifying, by an automation module, a first element of an application;

generating, by the automation module, a signature for the first element, the signature for the first element comprising one or more attributes descriptive of the first element;

after an update of the application, generating, by the automation module, a candidate element signature of a candidate element in the updated application, the candidate element signature comprising one or more attributes descriptive of the candidate element;

comparing, by the automation module, the signature for the first element to the candidate element signature to determine whether the first element matches the candidate element, thereby enabling the first element to be located after the update of the application, the comparing comprising determining a transformation distance between the signature for the first element and the candidate element signature; determining, by the automation module, that the candidate element matches the first element based at least in part on the transformation distance between the signature for the first element and the candidate element signature;

upon determining that the candidate element matches the first element, performing one or more testing operations on the candidate element as specified by the one or more testing scripts.

13. The computing system of claim 12, wherein identifying the candidate element comprises identifying a candidate element that has the same address as the first element.

14. The computing system of claim 12, wherein identifying the candidate element comprises identifying a candidate element that has a same ID as the first element.

15. The computing system of claim 12, wherein the transformation distance describes a degree of difference in attributes between the signature for the first element and the candidate element signature.

16. One or more tangible, non-transitory computer-readable media storing computer-readable instructions that when executed by one or more processors cause the one or more processors to perform operations for identifying user interface elements for performing testing operations as specified by one or more testing scripts, the operations comprising:

identifying a first element of an application;

generating a signature for the first element, the signature for the first element comprising one or more attributes descriptive of the first element;

after an update of the application, generating a candidate element signature for a candidate element in the updated application, the candidate element signature comprising one or more attributes descriptive of the candidate element;

comparing the signature for the first element to the candidate element signature to determine whether the first element matches the candidate element, thereby enabling the first element to be located after the update of the application, the comparing comprising determining a transformation distance between the signature for the first element and the candidate element signature; determining that the candidate element matches the first element based at least in part on the transformation distance between the signature for the first element and the candidate element signature;

upon determining that the candidate element matches the first element, performing one or more testing operations on the candidate element as specified by the one or more testing scripts.

17. The one or more tangible, non-transitory computer-readable media storing computer-readable instructions of claim 16, wherein the transformation distance describes a degree of difference in attributes between the signature for the first element and the candidate element signature.

* * * * *